(12) United States Patent
Ito

(10) Patent No.: US 11,511,728 B2
(45) Date of Patent: Nov. 29, 2022

(54) CONTROL UNIT FOR CONTROLLING TRAVELING STATE AND AIR CONDITIONING STATE

(71) Applicant: DENSO CORPORATION, Kariya (JP)

(72) Inventor: Yutaro Ito, Kariya (JP)

(73) Assignee: DENSO CORPORATION, Kariya (JP)

( * ) Notice: Subject to any disclaimer, the term of this patent is extended or adjusted under 35 U.S.C. 154(b) by 534 days.

(21) Appl. No.: 16/259,003

(22) Filed: Jan. 28, 2019

(65) Prior Publication Data

US 2019/0232938 A1 Aug. 1, 2019

(30) Foreign Application Priority Data

Jan. 29, 2018 (JP) .............................. JP2018-012344

(51) Int. Cl.
| | |
|---|---|
| *B60W 10/30* | (2006.01) |
| *B60W 30/188* | (2012.01) |
| *B60W 10/06* | (2006.01) |
| *B60W 10/08* | (2006.01) |
| *B60W 30/182* | (2020.01) |
| *F16H 59/66* | (2006.01) |

(Continued)

(52) U.S. Cl.
CPC ............ *B60W 10/30* (2013.01); *B60W 10/06* (2013.01); *B60W 10/08* (2013.01); *B60W 30/182* (2013.01); *B60W 30/188* (2013.01); *B60W 10/10* (2013.01); *B60W 30/1886* (2013.01); *B60W 2050/002* (2013.01); *B60W 2050/0013* (2013.01); *B60W 2400/00* (2013.01); *B60W 2510/0652* (2013.01); *B60W 2510/305* (2013.01); *F16H 2059/666* (2013.01)

(58) Field of Classification Search
CPC .... B60W 10/30; B60W 30/188; B60W 10/08; B60W 10/06; B60W 30/182; B60W 2050/002
USPC .......................................................... 701/58
See application file for complete search history.

(56) References Cited

U.S. PATENT DOCUMENTS

| | | | |
|---|---|---|---|
| 9,102,213 B2 * | 8/2015 | Motegi .............. | B60H 1/00764 |
| 10,029,539 B2 * | 7/2018 | Fuke ...................... | F02D 41/123 |

(Continued)

FOREIGN PATENT DOCUMENTS

| | | |
|---|---|---|
| JP | 2007-187090 A | 7/2007 |
| JP | 2007-291919 A | 11/2007 |

(Continued)

*Primary Examiner* — Thomas Randazzo
*Assistant Examiner* — Michael E Butler
(74) *Attorney, Agent, or Firm* — Oliff PLC

(57) ABSTRACT

A control unit that controls a travelling state and an air conditioning state of a vehicle includes: a drive control unit performing a vehicle speed control and a power train control, the vehicle speed control selectively executing an acceleration operation where an engine mounted on the vehicle is operated and a deceleration operation where the engine is stopped to allow the vehicle to coast, the power train control selectively executing activation or deactivation of the engine; m and an air conditioning control unit that controls an air conditioning system provided in the vehicle to execute an air conditioning control. A content of control is changed for at least one of the vehicle speed control, the power train control and the air-conditioning control while the air conditioning system is operating, compared to a case where the air conditioning system is not operating.

14 Claims, 13 Drawing Sheets

(51) Int. Cl.
    *B60W 10/10*         (2012.01)
    *B60W 50/00*         (2006.01)

(56)         References Cited

U.S. PATENT DOCUMENTS

| | | | |
|---|---|---|---|
| 2007/0044758 A1* | 3/2007 | Zhang | F02D 31/002 |
| | | | 123/350 |
| 2010/0038158 A1* | 2/2010 | Whitney | B60W 30/16 |
| | | | 180/65.265 |
| 2011/0067419 A1 | 3/2011 | Aoyagi | |
| 2016/0017825 A1 | 1/2016 | Maeda et al. | |
| 2018/0050699 A1* | 2/2018 | Gauthier | B60W 10/30 |
| 2018/0306525 A1 | 10/2018 | Kitou et al. | |
| 2019/0030990 A1 | 1/2019 | Okamoto et al. | |

FOREIGN PATENT DOCUMENTS

| | | |
|---|---|---|
| JP | 2009-286185 A | 12/2009 |
| JP | 2014-162371 A | 9/2014 |

\* cited by examiner

CONTROL UNIT FOR CONTROLLING TRAVELING STATE AND AIR CONDITIONING STATE

CROSS-REFERENCE TO RELATED APPLICATION

This application is based on and claims the benefit of priority from earlier Japanese Patent Application No. 2018-12344 filed Jan. 29, 2018, the description of which is incorporated herein by reference.

BACKGROUND

Technical Field

The present disclosure relates to a control unit that controls a travelling state and an air conditioning state of a vehicle.

Description of the Related Art

As a control unit that maintains the travelling speed of the vehicle to be a target cruising speed, the control unit is disclosed in which an upper speed limit and a lower speed limit are set with respect to the target cruising speed, and an engine mounted on the vehicle is repeatedly driven and stopped whereby the vehicle travels with the target speed between the upper limit and the lower limit.

SUMMARY

The present disclosure provides a control unit as a first aspect in which content of control is changed for at least one of a vehicle speed control, a power train control and an air conditioning control while the air conditioning system is operating.

BRIEF DESCRIPTION OF THE DRAWINGS

In the accompanying drawings.

DETAILED DESCRIPTION OF PREFERRED EMBODIMENTS

With reference to the drawings, embodiments of the present embodiment of the present disclosure will be described. To facilitate understanding of the explanation, the same reference numbers are applied to the same elements as much as possible in each drawing, and duplicated explanation will be omitted.

Figure 1:
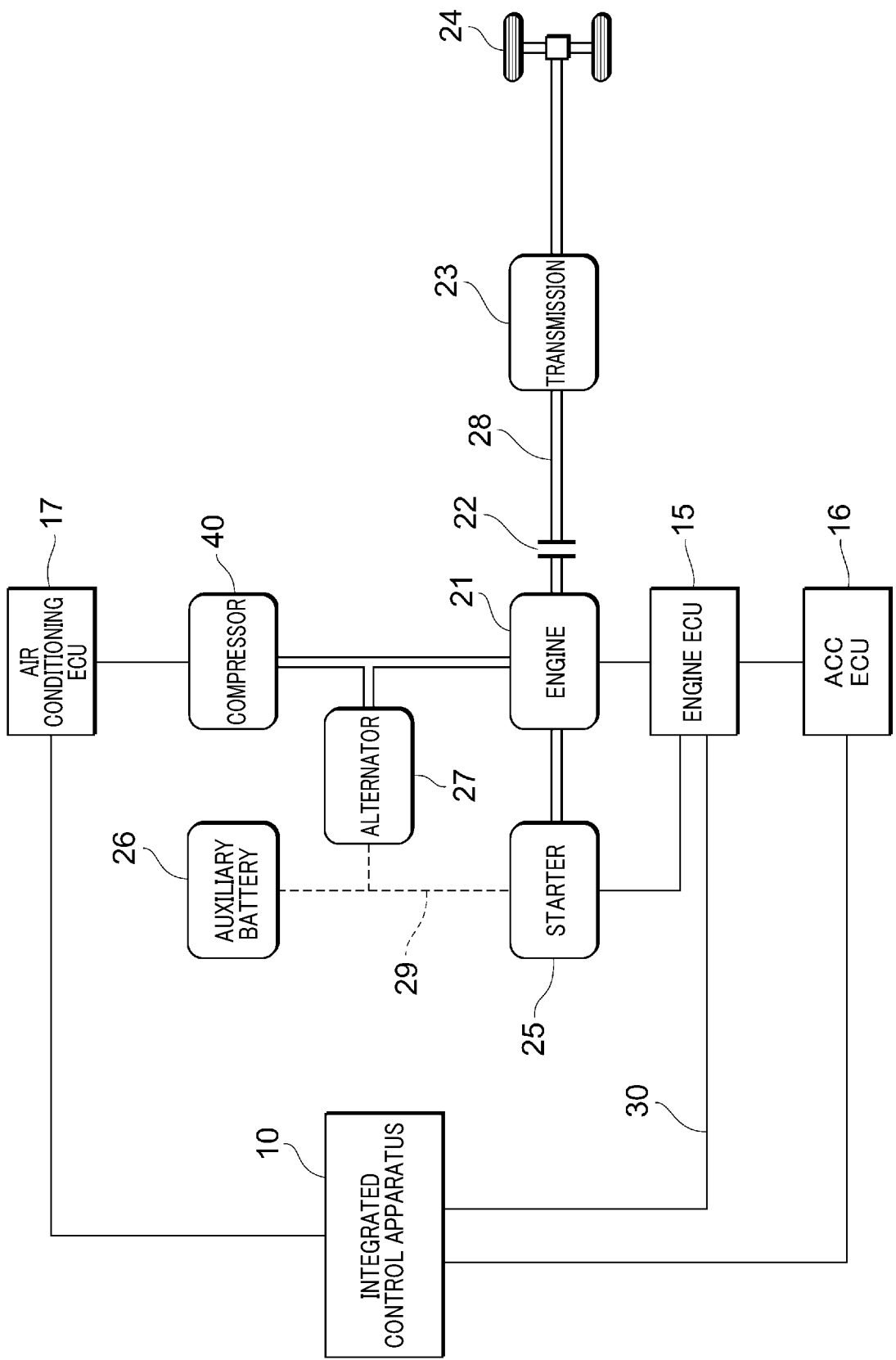
FIG. 1 is a block diagram showing a system configuration controlled by an integrated control apparatus.

FIG. 1 illustrates a configuration of a system controlled by an integrated control apparatus 10 corresponding to a control apparatus of the present disclosure. The integrated control apparatus 10 is connected to each of an engine ECU (electronic control unit) 15, ACC (adaptive cruise control) ECU 16, and an air-conditioning ECU 17 via a signal wiring 30, being mutually communicable with these ECUs.

An engine 21 and a starter 25 are connected to the engine ECU 15 via the signal wiring 30, and driven based on a control signal outputted by the engine ECU 15. The engine 21 is started by using a rotation of the starter 25. The starter 25 is connected to an auxiliary battery 26 via an equipment connection wiring 29 and rotates by a power supplied by the auxiliary battery 26.

The engine 21 and a transmission 23 are connected by a mechanical connection shaft 28 and a driving force of the engine 21 is transmitted to the transmission 23 by the rotational force of the mechanical connection shaft 28. The mechanical connection shaft 28 is provided with a clutch 22. The clutch 22 is disengaged to cutoff the driving force of the engine 21. The driving force changed by the transmission 23 is transmitted to the output shaft 24.

The alternator 27 converts a part of the driving force of the engine 21 to electric power. The part of the electric power converted by the alternator 27 is used to charge the auxiliary battery 26, and rest of the electric power is used for driving auxiliary components.

The ACC_ECU 16 calculates an engine command driving force for suitably controlling the vehicle speed based on information about the preceding vehicle, slope information, traffic jam information and the like. The ACC_ECU 16 outputs the drive command information to the engine ECU 15 based on the calculated engine command driving force.

The air-conditioning ECU 17 is connected to the compressor 40 via a signal wiring. The air-conditioning ECU 17 controls an electromagnetic clutch included in the compressor 40 to be engaged or disengaged, thereby controlling a driving of the compressor 40.

The compressor 40 is driven to rotate by a driving force of the engine 21. The compressor 40 constitutes the air-conditioning system. The air-conditioning system according to the present embodiment will be described with reference to FIG. 2.

Figure 2:
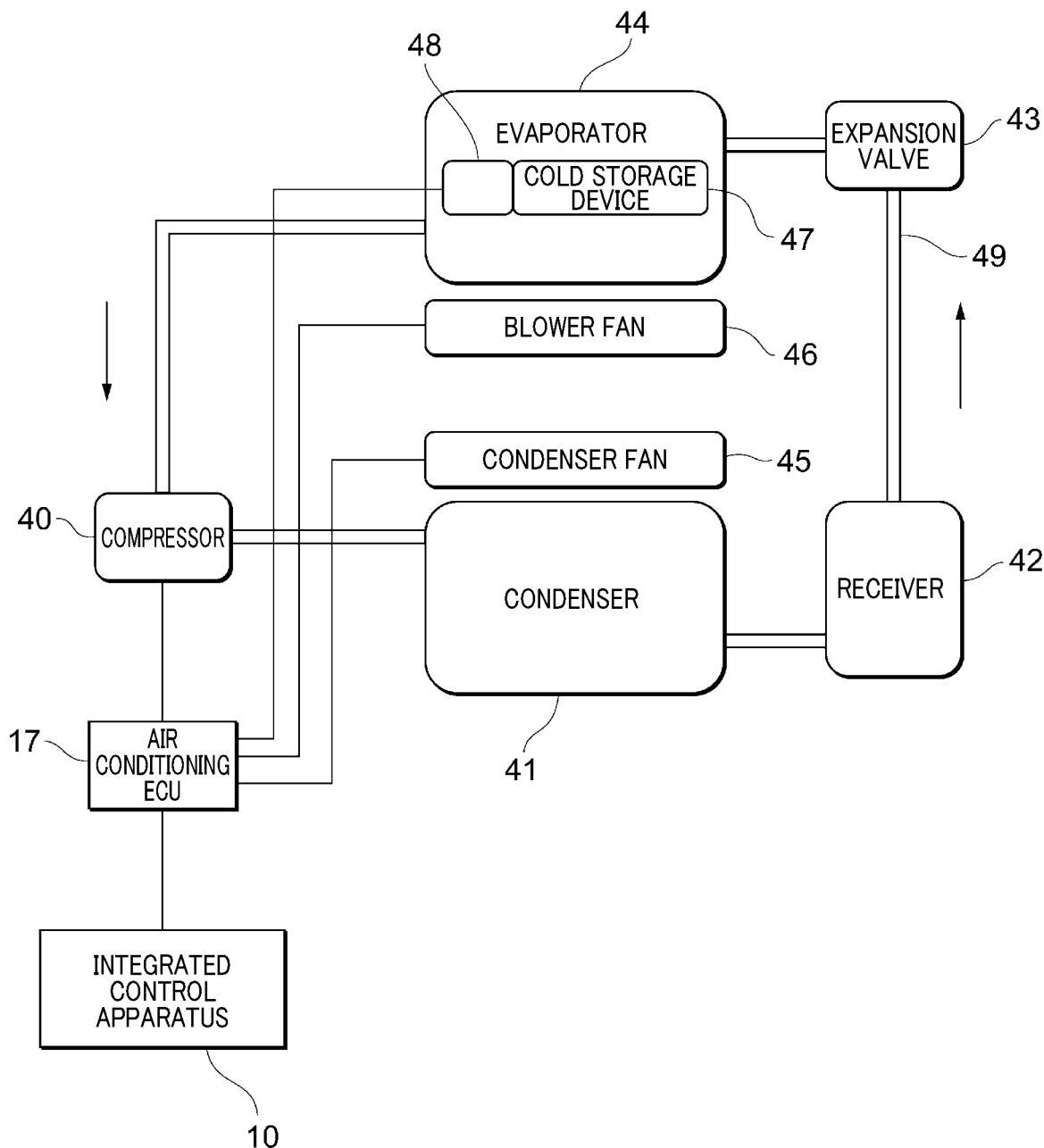
FIG. 2 is a block diagram showing a configuration of an air-conditioning system controlled by the integrated control apparatus.

As shown in FIG. 2, the air-conditioning system according to the present embodiment is provided with a compressor 40, a condenser 41, a receiver 42, an expansion valve 43, and an evaporator 44, to constitutes a refrigeration cycle. The air-conditioning ECU 17 is connected to the compressor 40, a condenser fan 45, and a blower fan 46 via signal wirings. The compressor 40, the condenser fan 45 and the blower fan 46 are driven by a control signal outputted by the air-conditioning ECU 17.

The compressor 40 is configured to compress the refrigerant flowing through the refrigerant passage, and send the refrigerant as the gas phase refrigerant at high temperature and pressure to the condenser 41. The gas phase refrigerant at high temperature and high pressure which is sent to the condenser 41 is heat-exchanged in the condenser 41 to become liquid phase refrigerant in high pressure. In this case, the condenser fan 45 is driven to send the refrigerant and the air for heat-exchange to the condenser 41.

The refrigerant which became high-pressure liquid phase is temporarily accumulated in the receiver 42. Thereafter, the accumulated refrigerant is sent to the expansion valve 43. The refrigerant sent to the expansion valve 43 is decompressed to become liquid phase refrigerant at low temperature and pressure and sent to the evaporator 44.

The liquid phase refrigerant at low temperature and pressure which is sent to the evaporator 44 is heat-exchanged at the evaporator 44. In this case, the blower fan 46 is driven, whereby a cooling air passing through the evaporator 44 is produced and supplied to the vehicle cabin.

The evaporator 44 is provided with a cold storage device 47. While the compressor 40 is being driven and the refrigerant is circulating, since the low temperature refrigerant is supplied to the evaporator 44, the cold storage device 4 is able to perform cold storage. Even when the compressor 40 is stopped, during the cold calories being stored in the cold storage 47, the blower fan 46 is driven whereby cooling air can be delivered to the vehicle cabin.

In the vicinity of the storage device 47, a temperature sensor 48 is provided in order to measure the temperature of the storage device 47. The temperature data of the storage device 47 detected by the temperature sensor 48 is outputted to the air-conditioner ECU 17. The air-conditioner ECU 17 determines, based on the temperature data, whether cooling air can be supplied even while the compressor 40 is being stopped.

Figure 3:
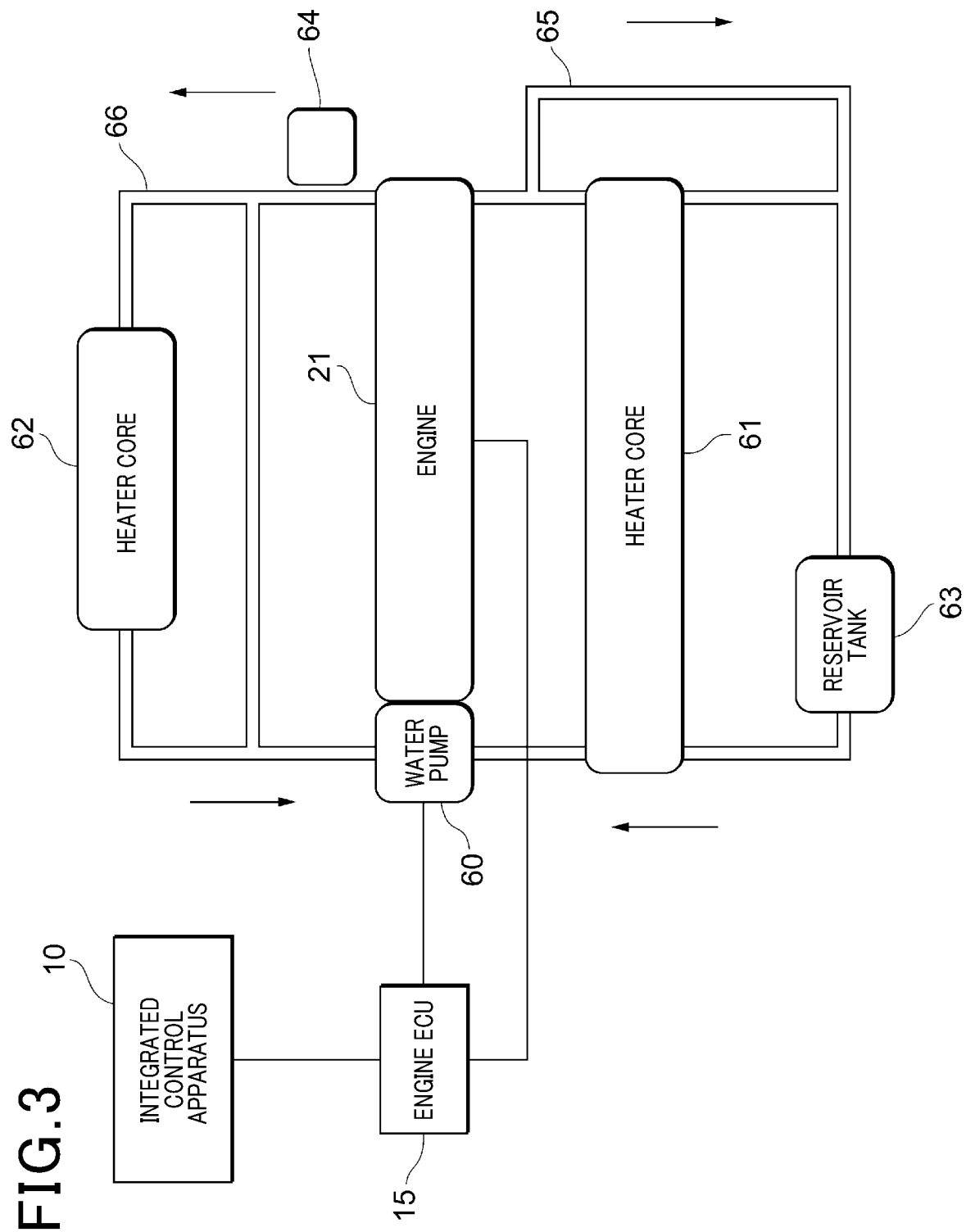
FIG. 3 is a block diagram showing a system configuration of a cooling water system controlled by the integrated control apparatus.

According to the air-conditioning system of the present embodiment, a heating operation is performed utilizing an exhaust heat of the engine 21. With reference to FIG. 3, a heating function will be described.

As shown in FIG. 3, in the air-conditioning system, a circulation passage 66 is provided to allow the cooling water of the engine 21 to flow therethrough. The cooling water in the circulation passage 66 is circulated by driving a water pump 60. The cooling water flows into the engine 21 to cool the engine 21 and becomes high in temperature. The cooling water at high temperature is divided into a flow into a heater core 61 and a flow into a heat core 62.

The heater core 62 is provided in a passage for supplying a warm air into the vehicle cabin. The cooling water at high temperature exchanges heat with the air at the heater core 62, and supplies the warm air into the vehicle cabin. A temperature sensor 64 is provided in order to measure the temperature of the cooling water flowing into the heater core 62.

The cooling water flowing into the heater core 61 is cooled by exchanging heat with atmospheric air. The degree of cooling of the cooling water can be adjusted by bypassing the bypass passage 65. The cooling water flowing through the heater core 61 or the bypass passage 65 is temporarily stored in a reservoir tank 63. The cooling water temporarily stored in the reservoir tank 63 passes through the heater core 61 again and returns to the engine 21.

The above-described system configuration is one example of the present disclosure. For example, instead of using the alternator 27, a motor generator may be provided. As the compressor 40, an electrical compressor may be used instead of using a mechanical type compressor. As the heating system, a heating system utilizing both of the electric energy and the exhaust heat of the engine 21 may be used, or a heating system utilizing only the electric energy may be used.

Figure 4:
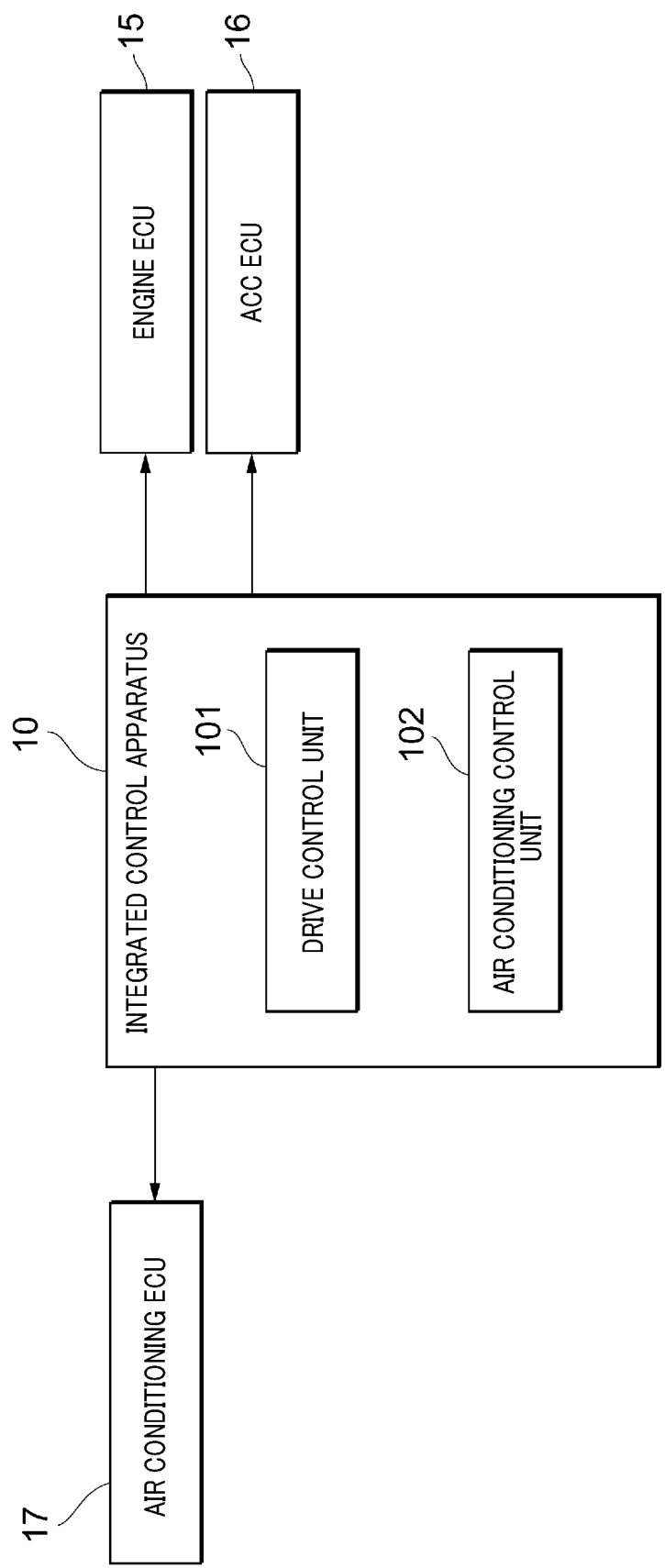
FIG. 4 is a functional block diagram showing the integrated control apparatus.

Subsequently, with reference to FIG. 4, the integrated control apparatus 10 will be described. The integrated control apparatus 10 controls a travelling state and an air conditioning state of the vehicle. The integrated control apparatus 10 is configured as a computer provided with a calculation unit such as CPU, a memory unit such as RAM and ROM and an interface unit for transmitting/receiving data as hardware elements. Next, functional elements of the integrated control apparatus 10 will be described.

The integrated control apparatus 10 is provided with a drive control unit 101 and an air conditioning control unit 102. The drive control unit 101 performs a vehicle speed control and a power train control. The vehicle speed control selectively executes an acceleration operation where the engine 21 mounted on the vehicle is operated and a deceleration operation where the engine 21 is stopped to allow the vehicle to coast. The power train control selectively executes activation or deactivation of the engine 21. The air conditioning control unit 102 controls the air conditioning system provided in the vehicle to execute an air conditioning control.

The drive control unit 101 and the air conditioning control unit 102 is configured such that while the air conditioning system is operating, a content of control is changed for at least one of the vehicle speed control, the power train control and the air-conditioning control, compared to a case where the air conditioning control is not operating. It should be noted that functional elements of the integrated control apparatus 10 may be distributed to the engine ECU 15, the ACC_ECU 16 and the air conditioning ECU 17.

As described, the integrated control apparatus 10 serves as an integrated control apparatus that controls the travelling state and the air conditioning state of the vehicle. The integrated control apparatus 10 is provided with the drive control unit 101 executing a vehicle speed control in which an acceleration operation executed by operating the engine 21 mounted on the vehicle and a deceleration operation executed by stopping the engine 21 to allow the vehicle to coast are selectively performed and a power train control that selectively executes activation or deactivation of the engine 21; and the air conditioning control unit 102 executing an air conditioning control by controlling the air conditioning system mounted on the vehicle. According to the integrated control apparatus 10, when the air conditioning system is operating, a content of control is changed for at least one of the vehicle speed control, the power train control and the air-conditioning control, compared to a case where the air conditioning control is not operating.

According to the present application, depending on activation/deactivation of the air conditioning system, a content of control is changed for at least one of the vehicle speed control, the power train control and the air-conditioning control, whereby the vehicle travelling and the air conditioning can be performed while balancing the travelling and the air conditioning. For example, when the air conditioning system utilizes a driving force or a heating value of the engine, degradation of air conditioning performance due to deactivation of the engine can be suppressed by changing the content of the vehicle speed control or the power train control. Similarly, when the air conditioning system utilizes a driving force or a heating value of the engine, for example, degradation of the fuel efficiency when prioritizing the air conditioning performance can be suppressed by changing a control content of at least one of the vehicle speed control, the power train control and the air conditioning control.

The drive control unit 101 according to the present embodiment is able to change the target acceleration factor in the vehicle speed control.

In the vehicle speed control, when the target acceleration factor is changed in the vehicle speed control, a ratio between the operating period and the stopping period of the engine 21 is changed such that the operation period is set to be longer while the stop period is set to be shorter, or the operating period is set to be shorter while the stopping period is set to be longer. By changing the operating period or the activation timing of the engine 21, an operation period of the engine 21 only for securing air conditioning properties can be suppressed, thereby improving the fuel efficiency.

The drive control unit 101 according to the present embodiment is able to lower the target acceleration factor in the vehicle speed control while the air conditioning system is operating.

In the case where lower target acceleration factor is set to have the vehicle travel with a constant speed or a lower speed increase, a period for reaching the target speed becomes longer so that the operation period of the engine 21 becomes longer and the stop period of the engine 21 becomes shorter. When the air conditioning system utilizes a driving force and the heating value of the engine 21, the utilization time can be secured longer. Accordingly, the air conditioning effects can be continued longer even in the deceleration travelling where the engine 21 is stopped. Hence, in the deceleration travelling, the operation period of the engine 21 can be shortened for securing only the air conditioning performance, thereby improving the fuel efficiency.

The drive control unit 101 according to the present embodiment performs the vehicle speed control, while the air conditioning system is operating in a heating mode, such that the lower the cooling water temperature of the engine 21, the smaller the target acceleration factor, or the larger the heat capacity necessary for operating the air conditioning system, the smaller the target acceleration factor.

The operation period of the engine 21 is required to be longer for executing the heating mode, as the temperature of the cooling water of the engine 21 becomes lower. Similarly, when the heat capacity necessary for operating the air conditioning system becomes larger, a long operation period of the engine 21 is required for executing the heating mode. In this respect, the target acceleration factor is set to be smaller to have the vehicle travel with constant speed or low speed increase to secure a longer operation period of the engine 21. As a result, the heating mode can be executed while suppressing degradation of the fuel efficiency caused by excessively restricting the vehicle speed control.

According to the present embodiment, the vehicle is provided with an alternator 27 or a motor generator as a power generation apparatus, and the drive control unit 101 is able to increase generation power of the power generation apparatus when the air conditioning system is operating in a heating mode.

In the case where the vehicle is provided with the power generation apparatus such as the alternator 27 or the motor generator, by increasing the generation power, the engine 21 is rotated in a high load region so that the engine can be driven with high efficiency while securing heating value of the engine 21. As a result, the fuel efficiency can be improved.

The drive control unit 101 according to the present embodiment, while the air conditioning system is operating in the cooling mode, the target acceleration factor is controlled such that the higher the temperature of the refrigerant sent to the evaporator in the air conditioning system, the lower the target acceleration factor in the vehicle speed control, or the larger an amount of a temperature decrease requirement to the air conditioning system, the lower the target acceleration factor in the vehicle speed control.

As the temperature of the refrigerant becomes higher, in order to execute the cooling mode, longer operation periods of the engine 21 and the compressor 40 are required to be secured. Similarly, when the temperature decrease requirement to the air conditioning system becomes larger, longer operation periods of the engine 21 and the compressor 40 are required to be secured in order to execute the cooling mode. In this regard, the target acceleration factor is set to be smaller to have the vehicle travel with constant speed or low speed increase to secure longer operation period of the engine 21. As a result, the heating mode can be executed while suppressing degradation of the fuel efficiency caused by excessively restricting the vehicle speed control.

The air conditioning system according to the present embodiment includes a cold storage device 47 performing a cold storage when the compressor 40 included in the air conditioning system is in operation and releasing cold when the compressor 40 is stopped. The air conditioning control unit 102 together with the vehicle speed control of the drive control unit 101 increases the drive power of the compressor 40.

By increasing the drive power of the compressor 40, the engine 21 rotates in the high load region so that cooling capability of the air conditioning system is enhanced and high efficient engine driving is performed. Hence, the fuel efficiency can be improved. Further, since the cold storage device 47 stores cold calories, the cooling capability can be maintained reliably.

The drive control unit 101 according to the present embodiment is able to disable stopping of the engine 21 in the vehicle speed control and the power train control, while the air conditioning system is operating in the heating mode and an amount of stored energy which can be used for the heating is less than a predetermined amount, or a temperature increase request to the air conditioning system is larger than a predetermined request value.

In the case where the amount of stored energy which can be used for the heating is small, longer operating period of the engine 21 in order to execute the heating mode has to be secured. Similarly, when a temperature increase request to the air conditioning system is larger than a predetermined request value, in order to execute the heating mode, longer operating period of the engine 21 has to be secured. Hence, by disabling stopping of the engine 21, the engine 21 can be operated even when the engine is required to stop during deceleration operation or the like. Therefore, lack of heat in the heating mode can be suppressed.

The drive control unit 101 according to the present embodiment is able to determine that the amount of stored energy is less than a predetermined amount when the temperature of the cooling water of the engine 21 is less than a predetermined temperature.

In the case where thermal energy produced in the engine 21 is utilized for the heating mode, an amount of the stored energy is determined to be less than a predetermined amount when the temperature of the cooling water is less than a predetermined temperature, whereby the engine 21 can be operated even when the engine is required to be stopped during a deceleration operation so that lack of heating in the heating mode can be suppressed.

When one of the following conditions is satisfied while the air conditioning system is operating in the cooling mode, the drive control unit 101 according to the present embodiment is able to disable stopping of the engine 21 in the power train control.

(condition 1) an amount of energy which can be utilized for the cooling mode is larger than a predetermined amount;

(condition 2) a temperature of the refrigerant sent to the evaporator included in the air conditioning system is higher than a predetermined temperature; and (condition 3) a temperature decrease requirement to the cooling request larger than a predetermined amount.

When one of conditions 1, 2 and 3 is satisfied, in order to execute the cooling mode, longer operation period of the engine 21 has to be secured and also a longer operation period of the compressor 40 has to be secured. Hence, by disabling stopping of the engine 21, the engine 21 can be operated even when the engine is required to stop during deceleration operation or the like. Therefore, lack of cooling power in the cooling mode can be suppressed.

The air conditioning system according to the present embodiment includes the cold storage device 47 that stores cold calories when the compressor 40 included in the air conditioning system is operating, and releases cold calories when the compressor 40 is in stopped condition. The drive control unit 101 is able to determine the condition 1 including the temperature of the cold storage device 47.

It is determined whether an amount of energy used for cooling is less than a predetermined amount, using a temperature of the cold storage device 47. For example, when the temperature of the cold storage device 47 is higher than a predetermined temperature, the amount of the energy used for the cooling can be determined to be less than the predetermined amount, and when the temperature of the cold storage device 47 is lower than a predetermined temperature, the amount of the energy used for the cooling can be determined to be more than the predetermined amount. Accordingly, even when the engine is required to stop in a deceleration operation or the like, insufficient cooling capability in the cooling mode is avoided.

For items using an acceleration factor as a control variable, the items may use other variables capable of achieving respective control targets, for example, an engine torque, an engine power or an allowable vehicle speed range. Also, for increasing the generation power, a charging power to the battery may increase or increased power may be applied to other electrical loads.

Subsequently, with reference to FIG. 5, an operation of the integrated control apparatus 10 will be described. At step S001, the air conditioning control unit 102 determines whether the air conditioning system is ON or not. When the air conditioning system is ON (step S001, YES), the process proceeds to step S011, and when the air conditioning system is not ON (step S001, NO), the process proceeds to step S051.

At step S101, the process determines whether the air conditioning control unit 102 is in a heating mode or not. When the air conditioning control unit 102 is in a heating mode (step S011, YES), the process proceeds to step S012, and when the air conditioning control unit 1012 is not in the heating mode (step S011, NO), the process proceeds to step S031. The case where the air conditioning control unit is not in the heating mode refers to a case of a cooling mode or a dehumidification mode.

At step S012, the air conditioning unit 102 determines whether the temperature of the cooling water of the engine is less than a temperature threshold α. The case where the temperature of the cooling water of the engine is less than the temperature threshold α refers to that the stored energy for the heating mode is less than a predetermined value. In the case where a heating apparatus using electrical energy is mounted on the vehicle, the process may determine whether the stored energy of the battery that supplies energy to the heating apparatus is less than a predetermined energy. When the temperature of the engine cooling water is less than the temperature threshold α (step S012, YES), the process proceeds to step S013. When the temperature of the engine cooling water is not less than the temperature threshold α (step S012, NO), the process proceeds to step S014.

At step S013, the drive control unit 101 disables a function for turning OFF of the engine 21 and outputs information notifying the engine ECU 15 and the ACC_ECU 16 of the disabling operation. At step S014, the drive control unit 101 enables turning OFF of the engine 21 and outputs information notifying the engine ECU 15 and the ACC_ECU 16 of the enabling operation.

Figure 6:
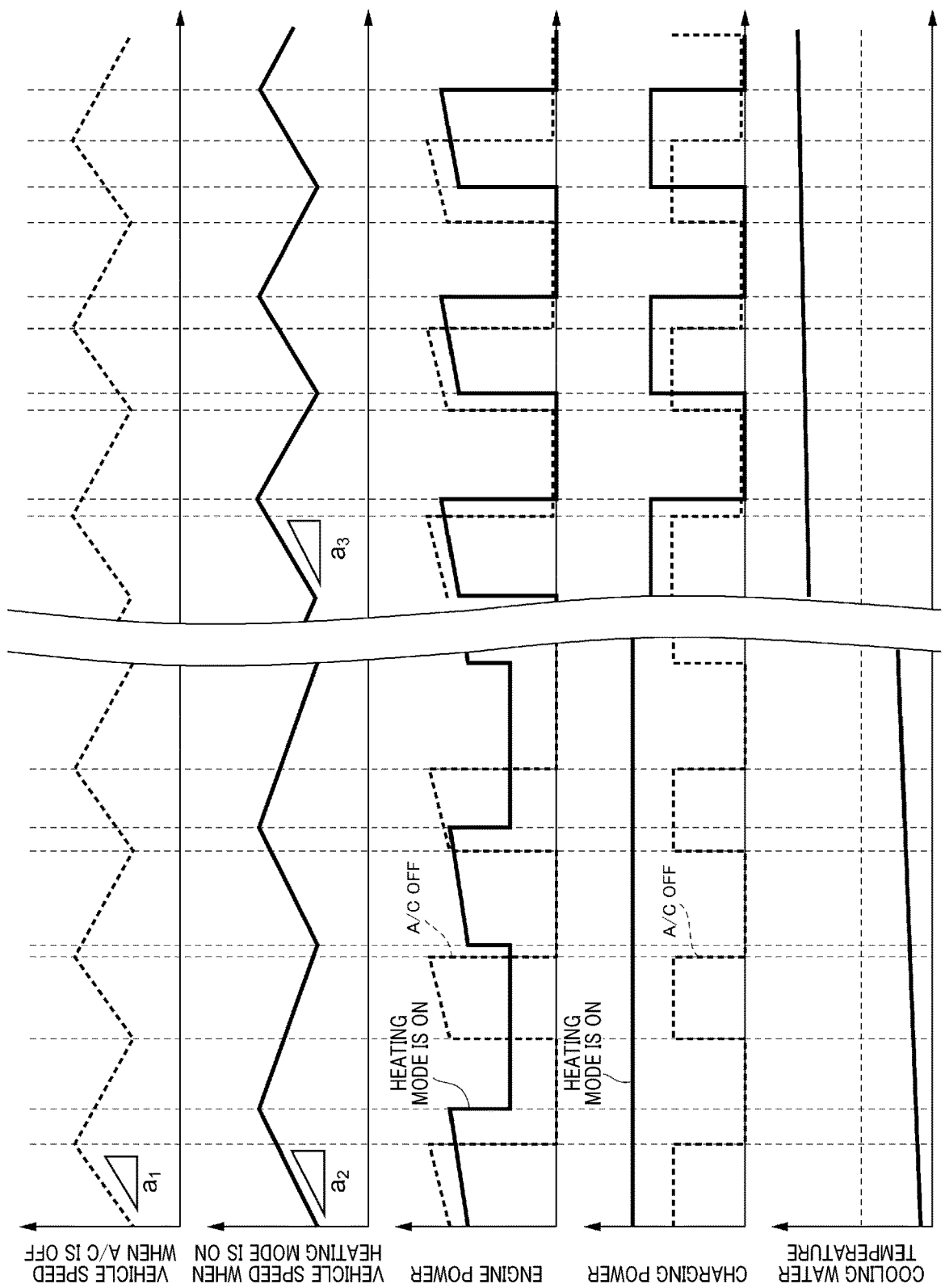
FIGS. 6A to 6E are timing diagrams each explaining an operation of the integrated control apparatus.

At step S015 subsequent to step S013 and S014, the ACC_ECU 16 sets the acceleration command. The way of setting the acceleration command will be described with reference to FIGS. 6A to 6E. FIG. 6A illustrates an acceleration command a1 when the air conditioning system is OFF for the comparison. FIG. 6B illustrates an acceleration command a2 and a3 when the air conditioning system is in a heating mode. FIG. 6C illustrates an engine power in which the solid line indicates the heating mode and the dotted line indicates a case where the air conditioning system is OFF. FIG. 6D illustrates a charging power in which the solid line indicates the heating mode and the dotted line indicates a case where the air conditioning system is OFF. FIG. 6E illustrates the temperature of the cooling water.

Figure 12:
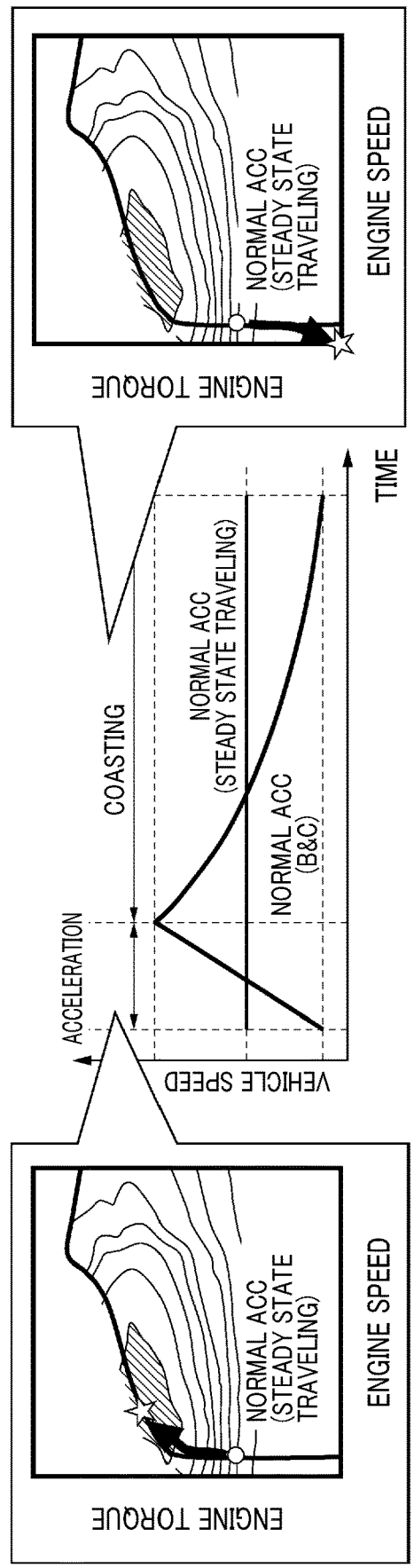
FIG. 12 is an explanatory diagram showing an example of an adaptive cruise control.
Figure 13:
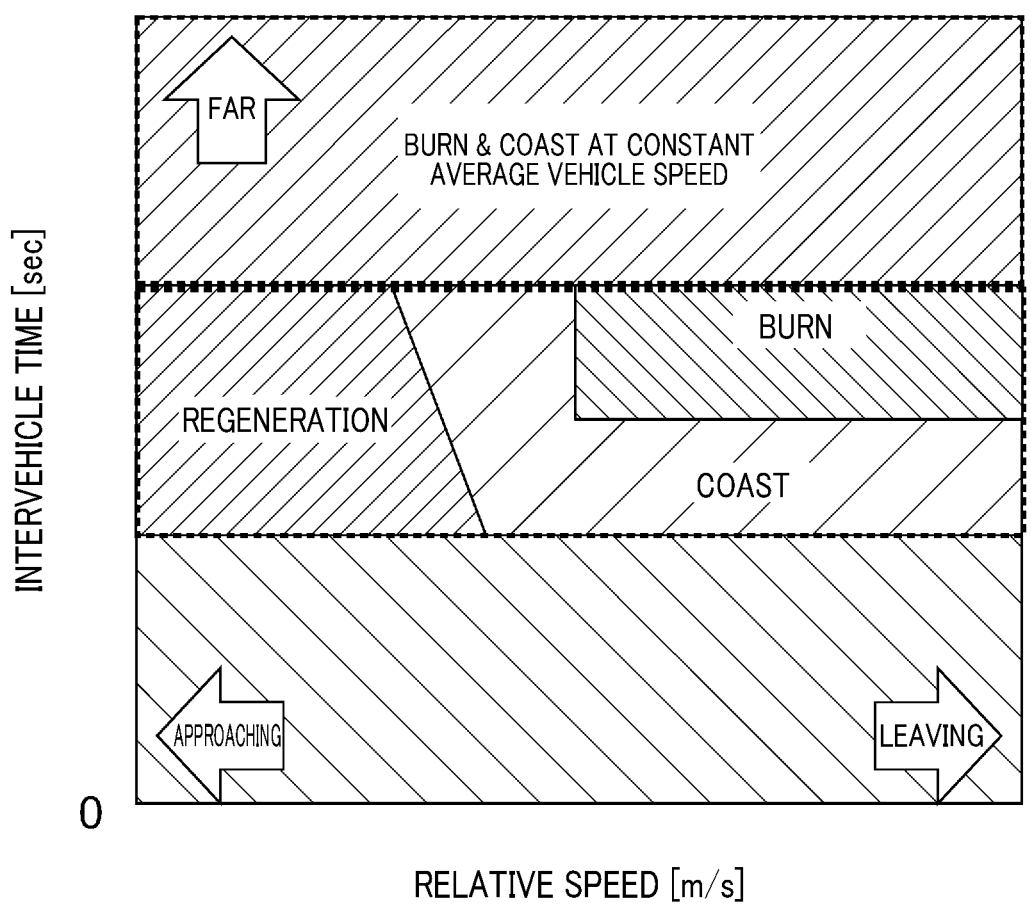
FIG. 13 is a graph showing an example of an adaptive cruise control.

According to an example shown in FIGS. 6A to 6E, the engine state is alternately changed between ON and OFF as a so-called burn and coast. As shown in FIG. 12, acceleration and coasting are switched, whereby the engine 21 can be driven in a zone having good engine efficiency during an acceleration operation, and the engine is stopped during a coasting operation, thereby improving the fuel efficiency. With reference to FIG. 13, an example of the burn and coast operation in order to improve the fuel efficiency will be described. As shown in FIG. 13, when an inter-vehicle time is larger than or equal to a predetermined range, the burn and coast operation is conducted so as to control the average vehicle speed to be constant. In the case where the inter-vehicle time is within the predetermined range, the regeneration operation is conducted when the vehicle approaches the preceding vehicle, and the burn and coast operation is conducted when the vehicle leaves away from the preceding vehicle. The acceleration command set at step S015 refers an acceleration command during the burn operation (during acceleration operation).

As shown in FIGS. 6A and 6B, an amount of the acceleration command a2 and a3 during the heating mode is controlled to be smaller than an amount of the acceleration command a1 when the air conditioning system is OFF. This is because, the ON period of the engine 21 is set to be longer by controlling the acceleration factor to be smaller, thereby securing heat for the heating mode. According to the present embodiment, an amount of the acceleration command a2 during low temperature state in the cooling water is controlled to be smaller than an amount of the acceleration command a3 during high temperature state in the cooling water. The generator is driven with high charging power when the temperature of the cooling water is low to rotate the engine 21 in a high load region, thereby increasing the temperature of the cooling water.

The acceleration command is set based on a map. An example of the map will be described with reference to FIGS. 8 and 9.

Figure 8:
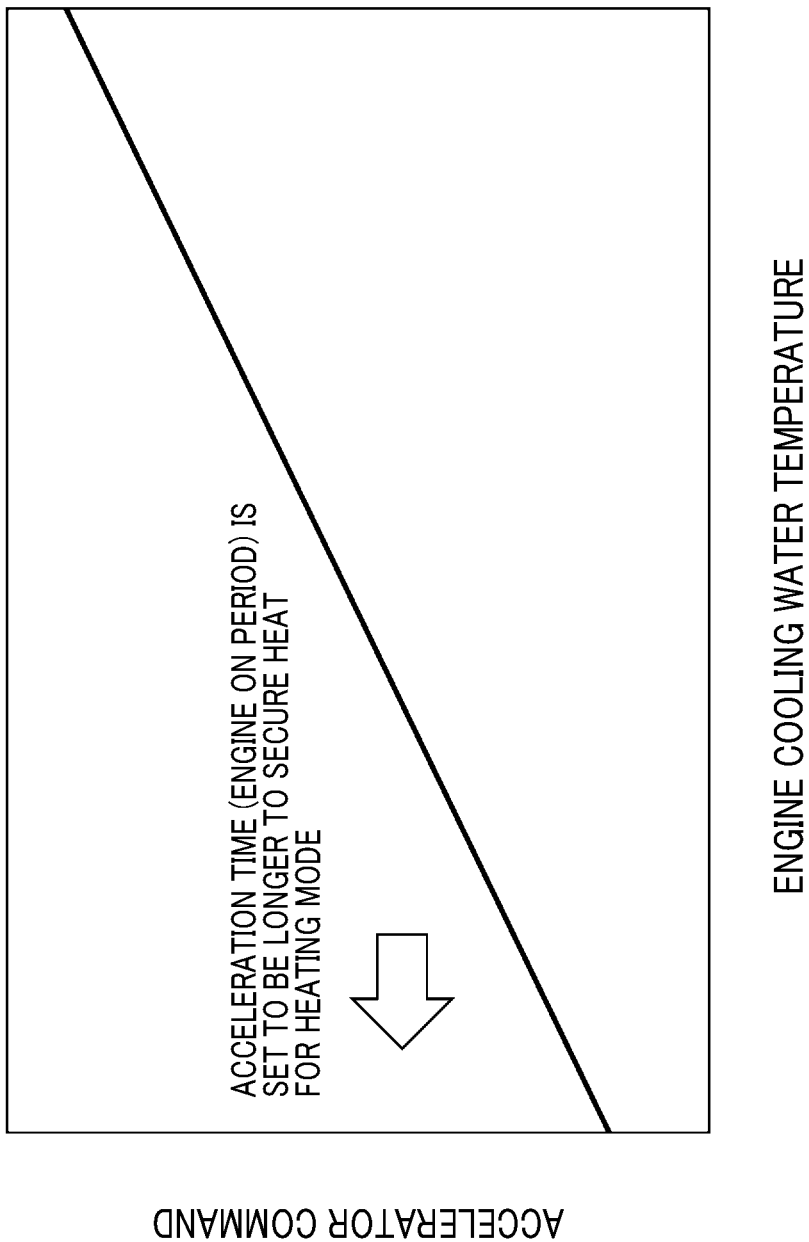
FIG. 8 is a graph showing an example of a relationship between the temperature of cooling water of the engine and an acceleration command.

The map shown in FIG. 8 illustrates a relationship between the temperature of the engine cooling water and the acceleration command. The lower the temperature of the engine cooling water, the smaller an amount of the acceleration command is. This is because, when the temperature of the engine cooling water is low, the acceleration time is set to be longer to secure heat for the heating mode. When the acceleration time is set to be longer, since the ON period of the engine 21 becomes longer, heat for the heating mode is secured.

Figure 9:
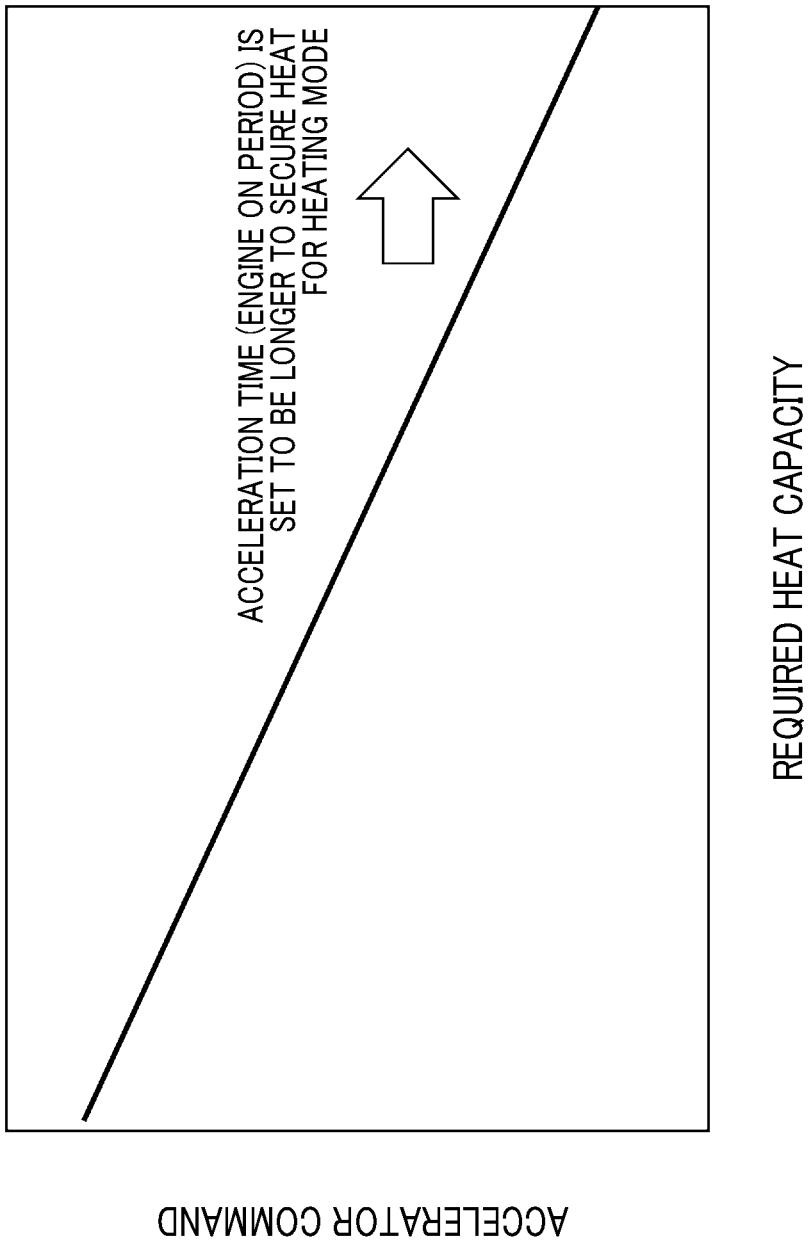
FIG. 9 is a graph showing an example of a relationship between a required heat capacity of a heater and an acceleration command.

A map shown in FIG. 9 illustrates a relationship between the required heat capacity and the acceleration command. Note that the higher the required heat capacity, the lower the acceleration command is, and the lower the required heat capacity, the larger the acceleration command is. This is because, when the required heat capacity is high, the acceleration time is set to be longer to secure heat for the heating mode. Setting the acceleration time to be longer, the ON period of the engine 21 becomes longer. Hence, the heat for the heating mode is secured.

Figure 5:
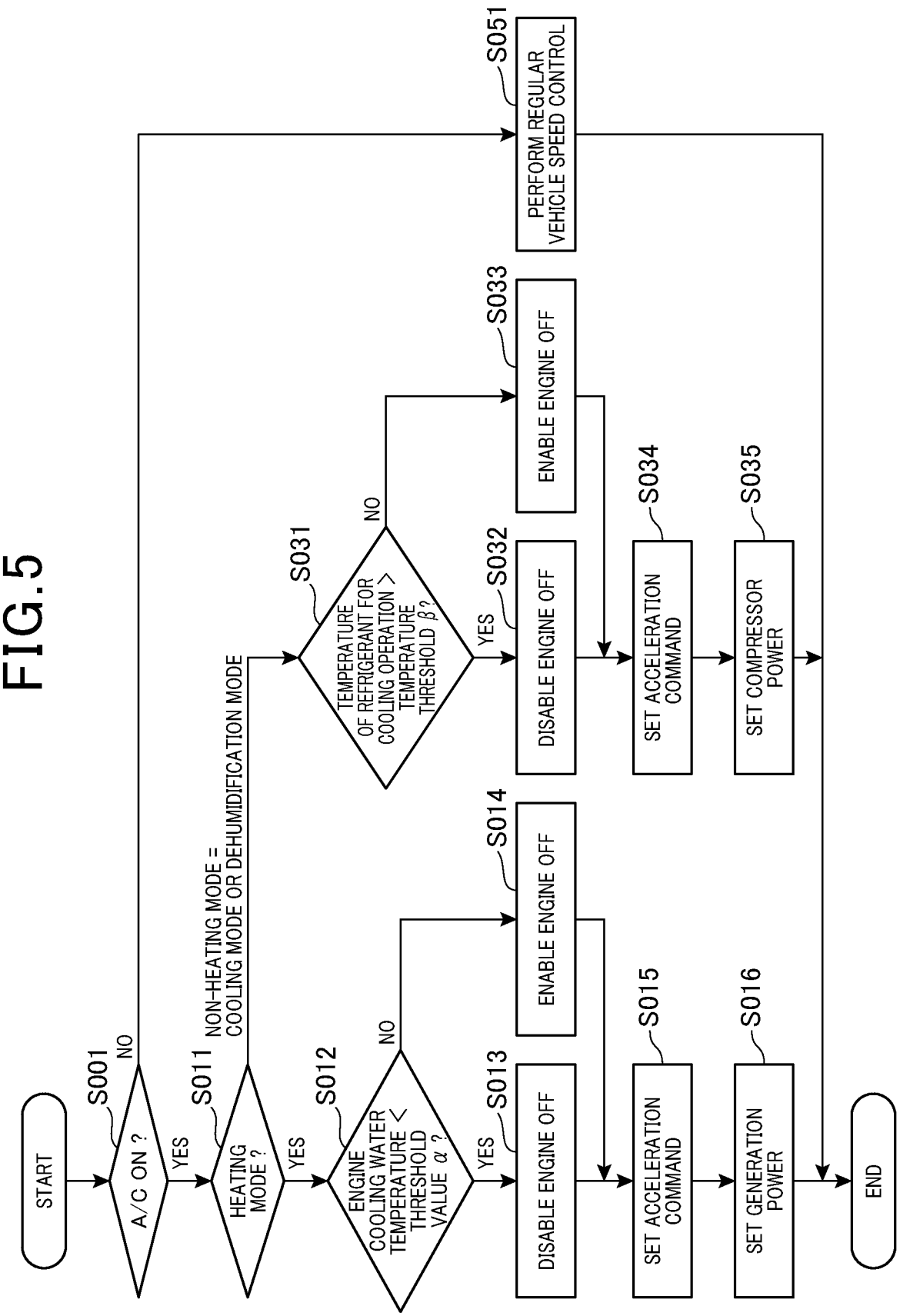
FIG. 5 is a flowchart explaining an operation of the integrated control apparatus.

With reference to FIG. 5, the explanation will be continued. At step S016 subsequent to step S015, the engine ECU 15 sets the generation power. The generation power is set corresponding to the charging power illustrated in FIG. 6D.

At step S031, the air conditioning control unit 102 determines whether the temperature of refrigerant for the cooling operation exceeds a temperature threshold β. When the temperature of refrigerant exceeds the threshold temperature β, the energy for cooling mode is less than a predetermined value. In the case where the cooling apparatus using electric energy is mounted on the vehicle, the air conditioning control unit 102 may determine whether the stored energy of the battery supplying energy to the cooling apparatus is lower than a predetermined energy. When the temperature of refrigerant for cooling operation exceeds the temperature threshold β (step S031, YES), the process proceeds to step S032, and when the temperature of refrigerant for cooling operation does not exceed the temperature threshold β (step S031, NO), the process proceeds to step S033.

At step S032, the drive control unit 101 disables a function for turning OFF of the engine 21 and outputs information notifying the engine ECU 15 and the ACC_ECU 16 of the disabling operation. At step S033, the drive control unit 101 enables a function for turning OFF of the engine 21 and outputs information notifying the engine ECU 15 and the ACC_ECU 16 of the enabling operation.

Figure 7:
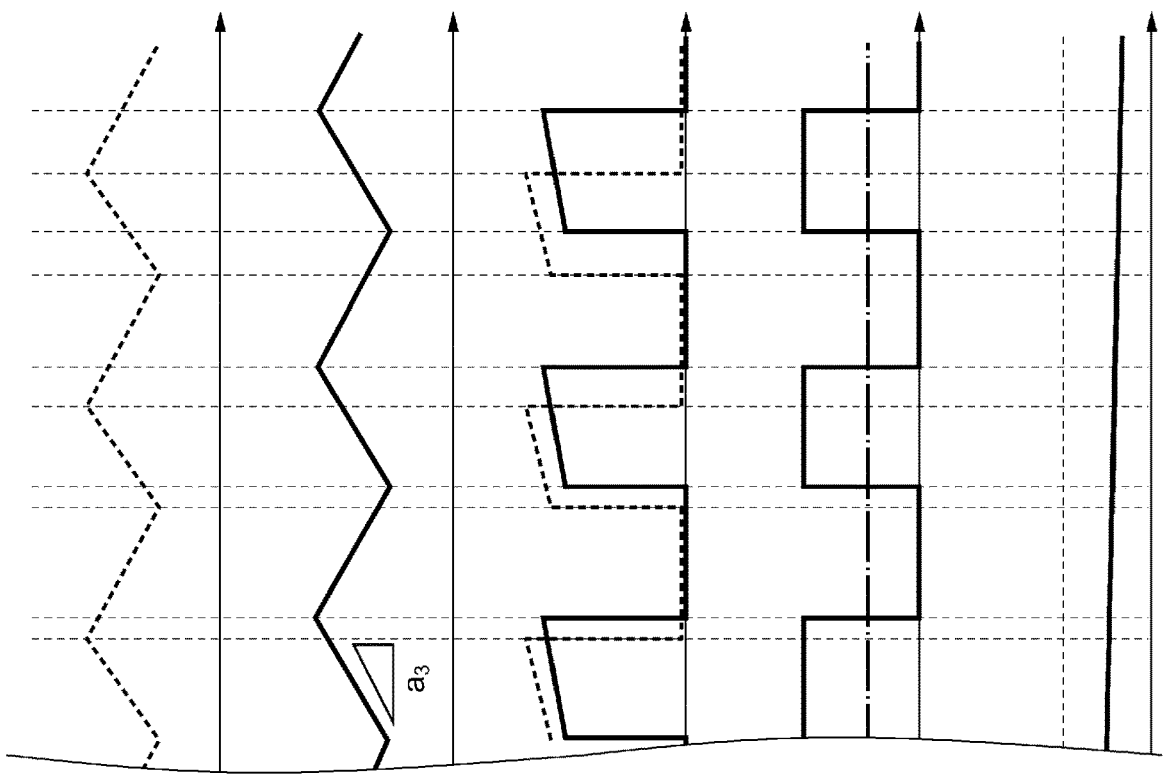
FIGS. 7A to 7E are timing diagrams each explaining an operation of the integrated control apparatus.

At step S032 subsequent to step S032 and S033, the ACC_ECU 16 sets the acceleration command. The way of setting the acceleration command will be described with reference to FIGS. 7A to 7E. FIG. 7A illustrates an acceleration command a1 when the air conditioning system is OFF for the comparison. FIG. 7B illustrates an acceleration command a2 and a3 when the air conditioning system is in a cooling mode. FIG. 7C illustrates an engine power in which the solid line indicates the cooling mode and the dotted line indicates a case where the air conditioning system is OFF. FIG. 7D illustrates a compressor power in which the solid line indicates the cooling mode and the dotted line indicates a case where the air conditioning system is OFF. FIG. 7E illustrates the temperature of the cold storage device.

According to an example shown in FIGS. 7A to 7E, the engine state is alternately changed between ON and OFF as a so-called burn and coast. Since the burn and coast has already been explained with reference to FIGS. 12 and 13, the explanation thereof will be omitted.

As shown in FIGS. 7A and 7B, an amount of the acceleration command a2 and a3 during the cooling mode is controlled to be smaller than an amount of the acceleration command a1 when the air conditioning system is OFF. This is because, the ON period of the engine 21 is set to be longer by controlling the acceleration factor to be smaller and operating the compressor 40 to secure the cooling capability, thereby storing cold calories to the cold storage device 47. According to the present embodiment, an amount of the acceleration command a2 during high temperature state of the cold storage device is controlled to be smaller than an amount of the acceleration command a3 during low temperature state of the cold storage device. When the temperature of the cold storage device is high, the compressor power is increased to rotate the engine 21 in a high load region, thereby decreasing the temperature of the cold storage device.

The acceleration command is set based on a map. An example of the map will be described with reference to FIGS. 10 and 11.

Figure 10:
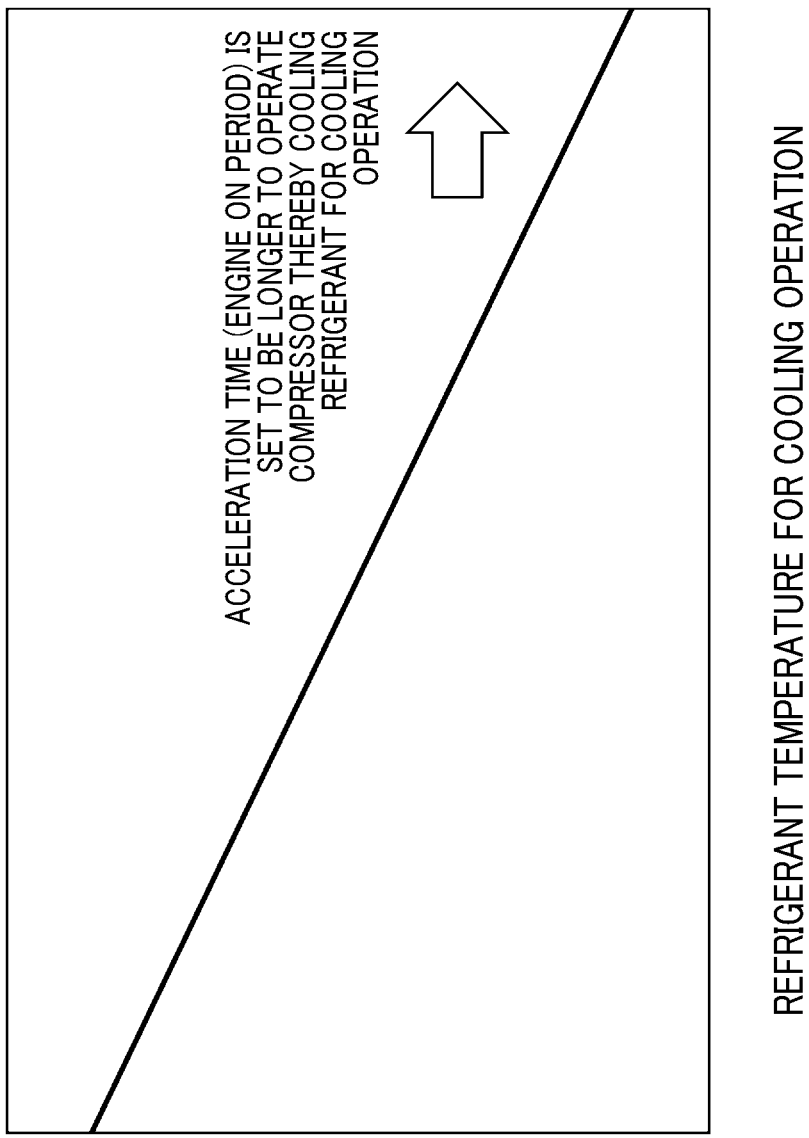
FIG. 10 is a graph showing an example of a relationship between the temperature of refrigerant for cooling operation and an acceleration command.

The map shown in FIG. 10 illustrates a relationship between the temperature of refrigerant for the cooling operation and an acceleration command. The higher the temperature of refrigerant for cooling operation, the smaller the acceleration command is, and the lower the temperature of refrigerant for cooling operation, the higher the acceleration command is. This is because, when the temperature of refrigerant for the cooling operation is high, the acceleration time is set to be longer to extend the operation period of the compressor 40, thereby cooling the refrigerant for cooling operation.

Figure 11:
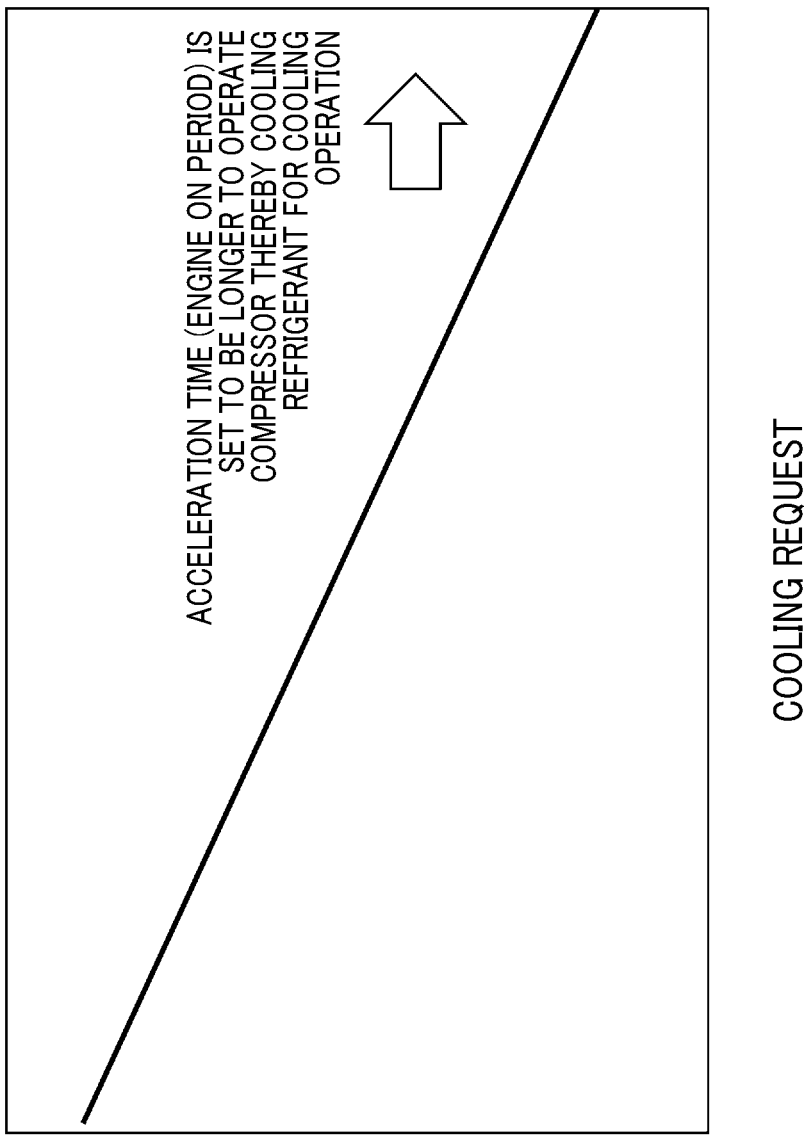
FIG. 11 is a graph showing an example of a relationship between a cooling request and an acceleration command.

FIG. 11 illustrates a relationship between a cooling request and an acceleration command. Note that the higher a magnitude of the cooling request, the lower the acceleration command is, and the lower the magnitude of the cooling request, the larger the acceleration command is. This is because, when the magnitude of the cooling request is high, the acceleration time is set to be longer to extend the operation period of the compressor 40, thereby cooling the refrigerant of the cooking operation.

A detailed setting method of the acceleration command will be described as follows. A motion equation of the vehicle is expressed as follows.

$$ma = F_{drv} + F_{rd} + mg \sin \theta$$

where m is vehicle weight, a is acceleration factor, $F_{drv}$ is vehicle driving force, $F_{rd}$ is travel resistance, g is gravitational acceleration and θ is slope inclination angle.

Note that the slope inclination angle θ takes a positive value for a down slope.

When the vehicle speed is multiplied to the vehicle speed V of the motion equation, the following equation for the power is obtained.

$$maV = F_{drv}V + F_{rl}V + mg\sin\theta V$$
$$= P_{drv} + P_{rl} + mg\sin\theta V$$

where $P_{drv}$ is vehicle power and $P_{rl}$ is travel resistance power.

Here, when defining $\eta_{tm}$ to be the efficiency of the transmission, $P_{comp}$ to be the drive power of the compressor and $P_{eng}$ to be the engine power, the equation of the power is expressed as follows.

$$maV = 1/\eta_{tm} \cdot (P_{eng} \square P_{comp}) + P_{rl} + mg \sin \theta V$$

The acceleration command a is expressed as the following equation. The acceleration command satisfying the requirement can be calculated based on the following equation using required $P_{comp}$, $P_{eng}$ capable of being driven with high efficiency.

$$a = 1/mV\eta_{tm} \cdot (P_{eng} \square P_{comp}) + 1/mV \cdot P_{rl} + g \sin \theta$$

With reference to FIG. 5, the explanation will be continued. At step S035 subsequent to step S034, the air-conditioning ECU 17 sets a compressor power.

At step S051, the drive control unit 101 determines to perform a regular vehicle speed control and outputs information notifying the engine ECU 15 and the ACC_ECU 16 of the regular vehicle speed control.

When completing processes of steps S016, S035 and S051, the entire process is terminated.

As described, the embodiments have been described with reference to specific examples. However, the present disclosure is not limited to these specific examples. The scope of the present disclosure may include examples where appropriate deign change is applied by person having ordinary skilled in the art as long as features of the present disclosure is included therein. Respective elements and their arrangement, conditions and shapes included in the above-described specific examples are not limited to those examples, but can be appropriately modified. Elements included in the respective specific examples may be appropriately combined as long as technical inconsistency does not occur.

As a control unit that maintains the travelling speed of the vehicle to be a target cruising speed, the following control unit is disclosed. In the control unit, an upper speed limit and a lower speed limit are set with respect to the target cruising speed, the control unit drives the engine to accelerate the vehicle to reach the upper speed limit, and after reaching the upper speed limit, the control unit maintains the travelling by stopping the engine. After stopping the engine and when the travelling speed of the vehicle decreases to reach the lower speed limit, the control unit restarts the engine so as to accelerate the vehicle. Thus, the engine is repeatedly driven and stopped, and the vehicle is able to travel with a travelling speed between the upper limit speed and the lower limit speed.

According to the above-described control unit the engine is repeatedly driven and stopped on the basis of the travelling speed range between the upper speed limit and the lower speed limit which are set to be an upper side and a lower side with respect to the target cruising speed. On the other hand, generally the vehicle is provided with an air-conditioning system mounted therein, in which energy of the engine is utilized for the air-conditioning system such that a compressor connected to the engine is used for a cooling mode and engine exhaust heat is used for a heating mode.

In the case where the above described control unit is applied for a vehicle provided with an air-conditioning system, energy of the engine cannot be utilized for the air-conditioning during a coasting operation where the engine is stopped. Hence, required air-conditioning performance may not be secured. On the other hand, when the engine is driven prioritizing the air-conditioning, the fuel efficiency may be lowered because the engine is driven and stopped without taking care of fuel efficiency.

In this respect, the present disclosure provides a control unit that controls a travelling state and an air conditioning state of a vehicle. The control unit includes: a drive control unit performing a vehicle speed control and a power train control, the vehicle speed control selectively executing an acceleration operation where an engine mounted on the vehicle is operated and a deceleration operation where the engine is stopped to allow the vehicle to coast the power train control selectively executing activation or deactivation of the engine; and an air conditioning control unit that controls an air conditioning system provided in the vehicle to execute an air conditioning control. A content of control is changed for at least one of the vehicle speed control, the power train control and the air-conditioning control while the air conditioning system is operating, compared to a case where the air conditioning control is not operating.

According to the present disclosure, depending on activation/deactivation of the air conditioning system, a content of the control is changed for at least one of the vehicle speed control, the power train control and the air conditioning control, whereby the vehicle travelling and the air conditioning can be performed while balancing the travelling and the air conditioning. For example, when the air conditioning system utilizes a driving force or a heating value of the engine, degradation of air conditioning performance due to deactivation of the engine can be suppressed by changing the content of the vehicle speed control or the power train control. Similarly, when the air conditioning system utilizes a driving force or a heating value of the engine, for example, degradation of the fuel efficiency when prioritizing the air conditioning performance can be suppressed by changing a control content of at least one of the vehicle speed control, the power train control and the air conditioning control.

The present disclosure provides a control unit capable of preventing the fuel efficiency from being degraded and securing sufficient air-conditioning performance, even when the engine is driven and stopped in a vehicle provided with an air-conditioning system.

What is claimed is:

1. A control unit that controls a travelling state and an air conditioning state of a vehicle comprising:
   a drive control unit performing a vehicle speed control and a power train control, the vehicle speed control selectively executing an acceleration operation where an engine mounted on the vehicle is operated and a deceleration operation where the engine is stopped to allow the vehicle to coast, the power train control selectively executing activation or deactivation of the engine; and
   an air conditioning control unit that controls an air conditioning system provided in the vehicle to execute an air conditioning control, wherein
   a condition of control is changed maintaining the control thereof, for at least one of the vehicle speed control, the power train control and the air-conditioning control while the air conditioning system is operating, compared to a case where the air conditioning system is not operating,
the air conditioning control is executed while the air conditioning system is operated without stopping an air conditioning function, regardless of the vehicle speed control and the power train control,
the drive control unit is configured to change a target acceleration factor in the vehicle speed control, and
the drive control unit is configured to perform the vehicle speed control, while the air conditioning system is operating in a heating mode, such that the lower a temperature of cooling water temperature of the engine, the smaller the target acceleration factor, or such that the larger a heat capacity necessary for operating the air conditioning system, the smaller the target acceleration factor.

2. The control unit according to claim 1, wherein
the drive control unit is configured to lower the target acceleration factor in the vehicle speed control while the air conditioning system is operating.

3. The control unit according to claim 1, wherein
the vehicle includes a power generation apparatus mounted thereon;
the drive control unit is configured to increase power generated by the power generation apparatus while the air conditioning system is operating in the heating mode.

4. The control unit according to claim 1, wherein
the drive control unit is configured to disable stopping of the engine in the vehicle speed control and the power train control, while the air conditioning system is operating in the heating mode and an amount of stored energy used for the heating is less than a predetermined amount, or a temperature increase request to the air conditioning system is larger than a predetermined request value.

5. The control unit according to claim 4, wherein
the drive control unit is configured to determine that an amount of the stored energy is less than a predetermined amount when a temperature of cooling water of the engine is less than a predetermined temperature.

6. The control unit according to claim 1, wherein
the drive control unit is configured to disable stopping of the engine in the power train control while the air conditioning system is operating in the cooling mode, when one of following conditions is satisfied:
(condition 1) an amount of energy utilized for the cooling mode is larger than a predetermined amount;
(condition 2) a temperature of the refrigerant sent to the evaporator included in the air conditioning system is higher than a predetermined temperature; and
(condition 3) a temperature decrease requirement to a cooling request is larger than a predetermined amount.

7. The control unit according to claim 6, wherein
the air conditioning system includes a cold storage device performing a cold storage when a compressor included in the air conditioning system is in operation and releasing cold when the compressor is stopped; and
the drive control unit is configured to determine the condition 1 including the temperature of the cold storage device.

8. A control unit that controls a travelling state and an air conditioning state of a vehicle comprising:
a drive control unit performing a vehicle speed control and a power train control, the vehicle speed control selectively executing an acceleration operation where an engine mounted on the vehicle is operated and a deceleration operation where the engine is stopped to allow the vehicle to coast, the power train control selectively executing activation or deactivation of the engine; and
an air conditioning control unit that controls an air conditioning system provided in the vehicle to execute an air conditioning control, wherein
a condition of control is changed maintaining the control thereof, for at least one of the vehicle speed control, the power train control and the air-conditioning control while the air conditioning system is operating, compared to a case where the air conditioning system is not operating,
the air conditioning control is executed while the air conditioning system is operated without stopping an air conditioning function, regardless of the vehicle speed control and the power train control,
the drive control unit is configured to change a target acceleration factor in the vehicle speed control, and
the drive control unit is configured to control the target acceleration factor in the vehicle speed control while the air conditioning system is operating in a cooling mode, such that the higher a temperature of refrigerant sent to an evaporator in the air conditioning system, the lower the target acceleration factor in the vehicle speed control, or such that the larger an amount of a temperature decrease requirement to the air conditioning system, the lower the target acceleration factor in the vehicle speed control.

9. The control unit according to claim 8, wherein
the air conditioning system includes a cold storage device performing a cold storage when a compressor included in the air conditioning system is in operation and releasing cold when the compressor is stopped; and
the air conditioning control unit together with the vehicle speed control of the drive control unit increases a drive power of the compressor.

10. The control unit according to claim 8, wherein
the drive control unit is configured to lower the target acceleration factor in the vehicle speed control while the air conditioning system is operating.

11. The control unit according to claim 8, wherein
the drive control unit is configured to disable stopping of the engine in the vehicle speed control and the power train control, while the air conditioning system is operating in a heating mode and an amount of stored energy used for the heating is less than a predetermined amount, or a temperature increase request to the air conditioning system is larger than a predetermined request value.

12. The control unit according to claim 11, wherein
the drive control unit is configured to determine that the amount or stored energy is less than a predetermined amount when a temperature of cooling water of the engine is less than a predetermined temperature.

13. The control unit according claim 8, wherein
the drive control unit is configured to disable stopping of the engine in the power train control while the air conditioning system is operating in the cooling mode, when one of following conditions is satisfied:
(condition 1) an amount of energy utilized for the cooling mode is larger than a predetermined amount;
(condition 2) a temperature of the refrigerant sent to the evaporator included in the air conditioning system is higher than a predetermined temperature; and (condition 3) a temperature decrease requirement to a cooling request is larger than a predetermined amount.

14. The control unit according to claim 13, wherein the air conditioning system includes a cold storage device performing a cold storage when a compressor included in the air conditioning system is in operation and releasing cold when the compressor is stopped; and the drive control unit is configured to determine the condition 1 including the temperature of the cold storage device.

* * * * *